April 7, 1942. E. E. SLICK 2,278,572
METHOD OF MANUFACTURING GLASS ARTICLES
Filed Sept. 26, 1936 4 Sheets-Sheet 1

INVENTOR
Edwin E. Slick
By Thomas & Miller

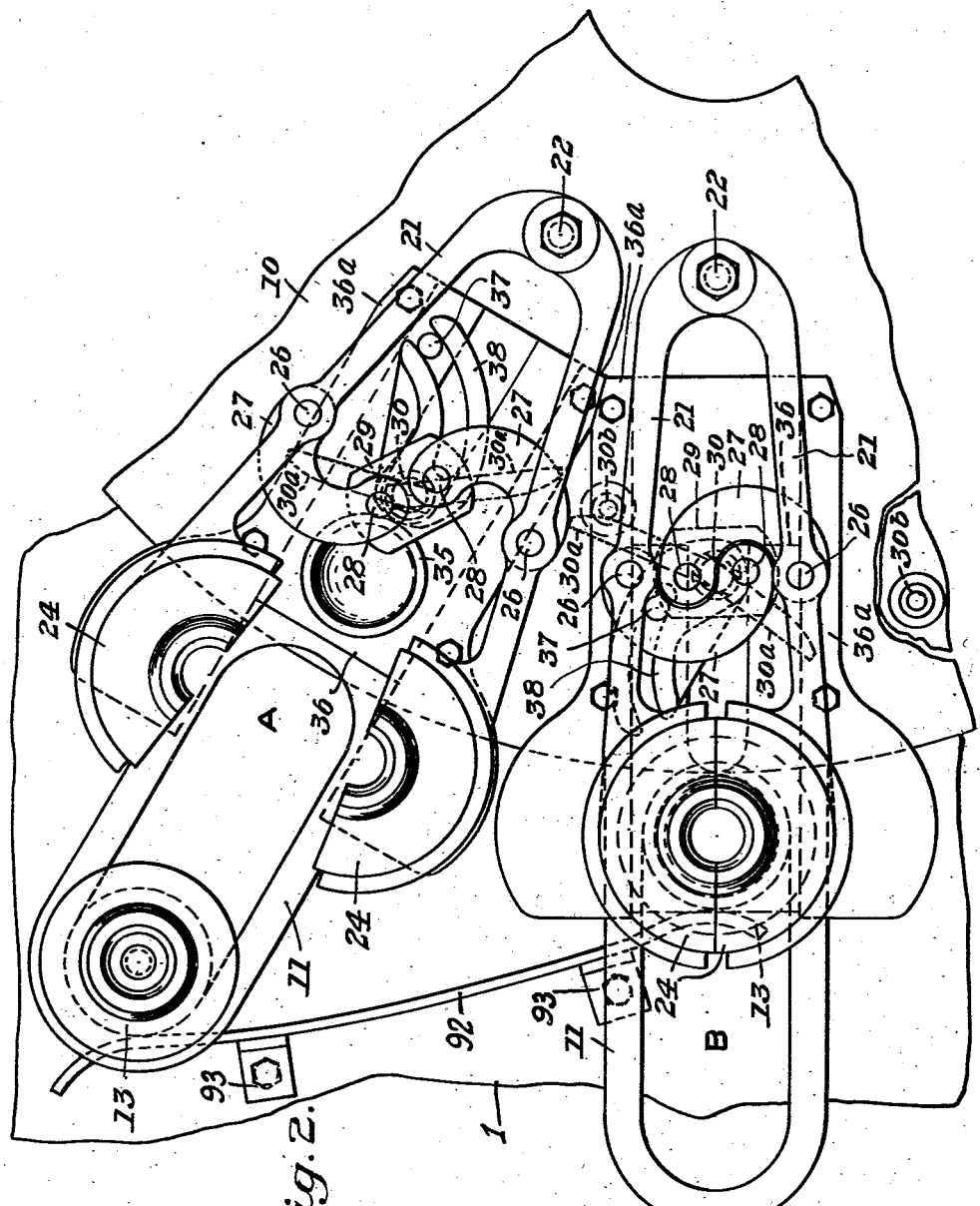

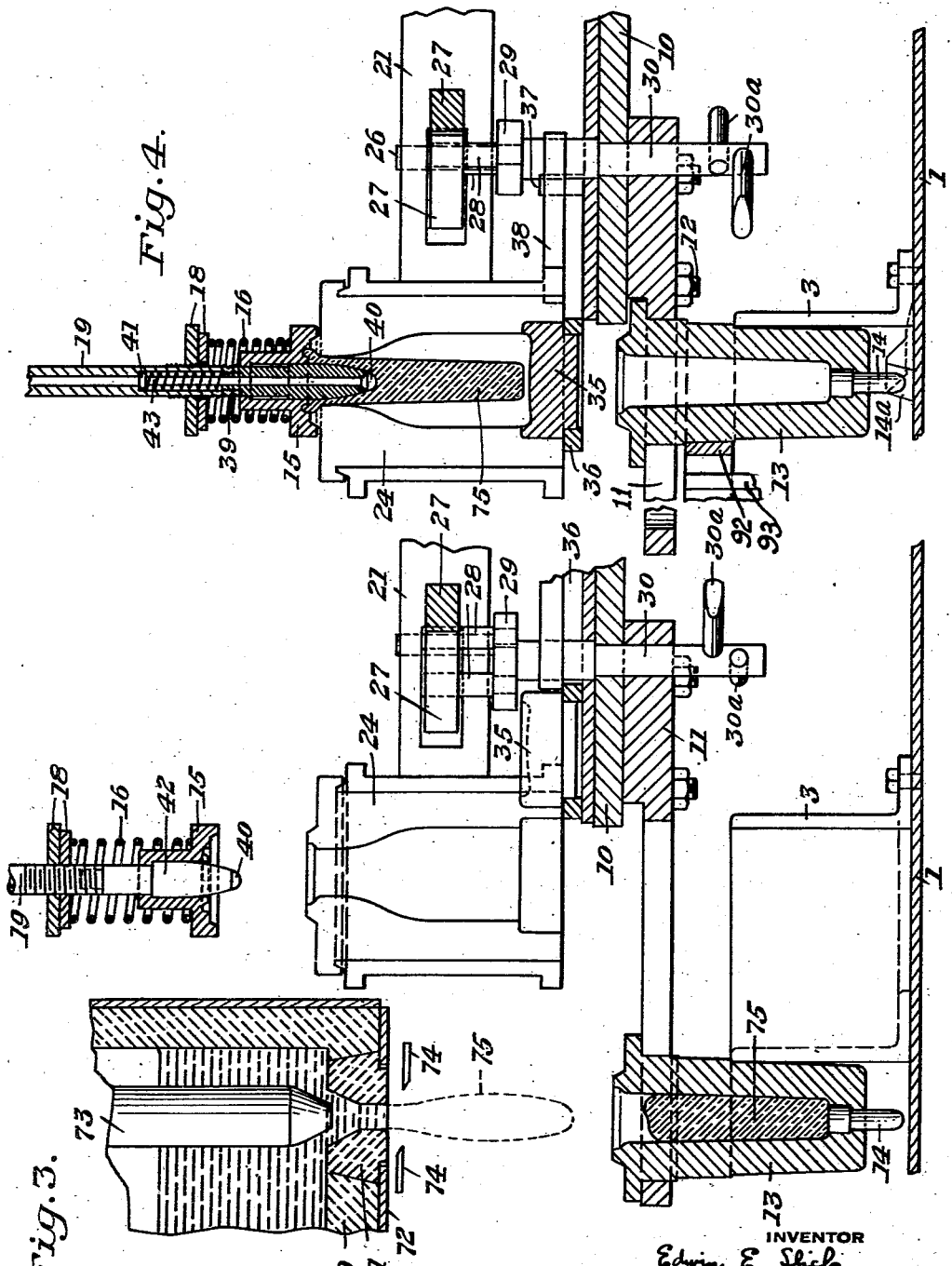

Patented Apr. 7, 1942

2,278,572

UNITED STATES PATENT OFFICE 2,278,572

METHOD OF MANUFACTURING GLASS ARTICLES

Edwin E. Slick, Pittsburgh, Pa.

Application September 26, 1936, Serial No. 102,769

7 Claims.  (Cl. 49—80)

This invention pertains to the manufacture of ware such as glass articles from liquid, viscous and/or plastic materials, such as molten glass, and more particularly to procedure for collecting, handling and forming such materials, and also, to apparatus for carrying out the procedure.

In my copending application Ser. No. 64,227, filed February 17, 1936, entitled Glassware making apparatus, I have set forth a machine for continuously making ware, such as glass articles, by a continuous method. The present invention discloses apparatus which may be employed in connection with such a machine for forming ware by the blow method, as distinguished from the press method of said copending application.

In accordance with the present invention, I have provided a simple and effective form of apparatus for collecting, handling, and forming ware. Previous to the present invention, glassware making apparatus has been very complex in design and intricate in operation, and it has been an object of my invention to provide a new and improved procedure for forming glassware which is relatively simple in its operation.

Another object of my invention has been to provide new and improved procedure for forming articles by a press and blow operation.

A further object of my invention has been to provide a new and improved method of handling the materials employed in forming ware.

These and many other objects of my invention will appear to those skilled in the art from the description of the invention, the disclosure of the drawings, and from the appended claims. In the drawings—

Figure 2 is a top plan section of molds employed in the disclosure of Figure 1;

Figure 3 is a vertical sectional elevation of a portion of the apparatus of Figure 1, and showing a forehearth and an associated feed orifice; in this figure a parison mold has received a gather and blow mold sections are in an open position;

Figure 4 is a vertical section somewhat similar to Figure 3, but showing closed blow mold sections containing a parison that has been raised from a parison mold;

In carrying out my invention, I collect a gather or charge of the material to be formed in a parison or blank mold cup. The gather is then partially formed or formed into a parison in the mold cup by a reciprocating, vertically-operating presser-plunger mechanism. The partially formed blank or parison is raised from the blank mold until it is substantially in alinement with the mold sections of an associated, vertically-spaced blow or finishing mold cup. The plunger and a cover plate for the parison mold are raised simultaneously by means of a piston mechanism until they clear the top of the blow mold sections. A bottom cover plate is then moved outwardly to a position in alinement with the open blow mold sections, and the mold sections are closed about this bottom plate by suitable cam means which may be actuated by the movement of the carrier. The plunger is then actuated to move downwardly a slight distance within the blow mold until the cover plate associated therewith closes off the top of such mold. The plunger presses the blank while air is admitted through it to blow the blank; in this manner, the blank is finished to provide an article of ware of the desired shape.

After the article has been formed, the plunger and its associated cover plate are lifted above the blow mold, the blow mold sections are opened, and the article is discharged.

The plunger may be actuated by a pneumatic fluid or by a hydraulic fluid, see my copending application.

In one embodiment of my invention, the gather is dropped into the blank mold from the top thereof, being discharged from a feed orifice. In another embodiment of my invention, the gather is sucked up from the surface of glass in the forehearth within the blank mold cup, the plunger acts to press the blank and to thus partially form it, and the blank mold is raised above the forehearth. However, in both embodiments the plunger and its associated mechanism function in substantially the same manner after the material has been gathered within the blank mold.

In the second-mentioned embodiment the blank mold cup may be raised above the forehearth before the blank is raised out of it towards the finish mold cup. Any suitable form of mechanism may be employed (not shown), to sever the charge or gather from the glass in the forehearth after the blank mold has been raised sufficiently. The severing mechanism is preferably timed to the operation of the machine.

Although the present invention, as will appear from the description thereof, is especially suitable for employment with a continuous machine, such as disclosed in my copending application, yet it may be employed in connection with any suitable type of machine, whether its operation is continuous or intermittent, and whether or not the material is fluid, viscous, or plastic when collected by the blank or parison mold cup or cups.

Figure 1:
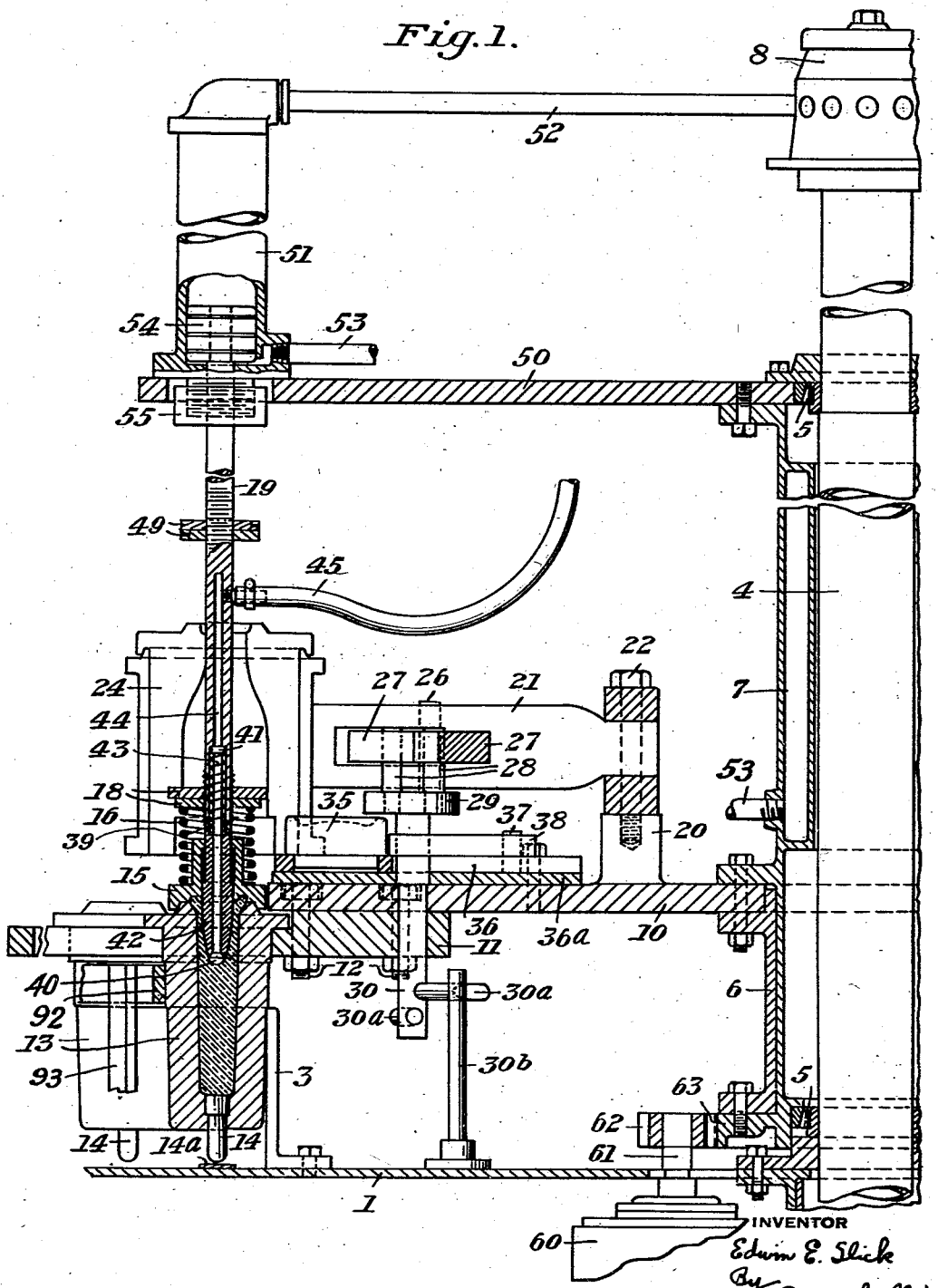
Figure 1 is a vertical section of apparatus constructed in accordance with my invention, and showing a formed parison in a parison mold.

In Figure 1, I have shown a section through such a machine as shown in my copending application, which includes a bed frame 1, fixedly mounted upon a suitable carriage (not shown), and supporting a stationary vertical column member 4 which is rigidly secured thereto. This column is preferably centrally located and rotatably supports the operating mechanism of the present invention through the agency of bearings 5. The rotating structure of the present invention includes a vertically extending column 6 positioned around the column 4 and supporting radially extending upper and lower carrier tables 50 and 10, respectively.

The vertical column 6 and the associated radially extending carrier members 10 and 50 are rotated by means of a gear reduction unit 60, shaft 61, pinion 62 and gear 63 secured to the column. Operating mechanism of this type has been previously described in my copending application.

The lower table 10 supports a plurality of parison molds at spaced positions therealong, by means of slotted guide plates 11 bolted to the bottom face thereof by suitable bolts 12. As shown, particularly in Figure 2, each guide plate 11 is of U-shaped outline, permitting the cup 13 to move on a horizontal plane radially inwardly and outwardly to glass-collecting and parison-forming positions.

Each blank mold cup 13 is provided with an individual, outwardly-extending U-shaped guide member 11 and is moved outwardly to receive a gather of glass 75, as shown particularly in Figure 3, by an upwardly extending fixed cam track 3 that is secured to the stationary framework 1 of the machine. Thus, as the table 10 and its associated blank molds rotate, the cam tracks 3 cooperate with the sides of the parison molds to move them outwardly to receive a charge of glass. The cups 13 may be moved inwardly to receive a parison from the plunger or shaper 42 by any suitable means such as tracks 92 mounted by brackets or standards 93 on the table 1, see also my copending application. The table 10 may be provided with any suitable number of circumferentially - spaced radially - positioned blank molds 13.

In Figure 3, I have shown a forehearth 70 having suitable plates 72 for supporting a refractory orifice portion 71. A plunger or needle 73 is preliminarily adjusted to provide the desired flow for a given temperature, head, and type of material which is to be utilized. Shear blades 74 have been diagrammatically shown, and may be of the type disclosed in my copending application.

A gob 75, see particularly Figure 3, is severed from the glass in the forehearth and blank mold 13 is timed in outward movement to receive it. Then, the mold 13 is moved inwardly, carrying the gather with it to a position in co-axial alinement with a plunger 42 and a blow mold 24.

As seen particularly in Figure 1, I carry blow mold sections 24 upon the same carrier 10 which carries the blank molds 13. A pair of blow mold sections 24 are provided for each of the blank molds 13, and are mounted substantially in alinement with and above the blank molds. A cover plate member 15 serves as a top cover plate for both the parison mold 13 and for its associated blow mold cup 24. It is resiliently and slidably mounted on the plunger operating shaft 19, and is provided with an upwardly projecting sleeve portion which receives a spiral positioning spring 16. Positioning plates 18 are threaded upon the operating stem 19 and hold the other end of the spring 16 in position.

By reason of this construction, the cover plate 15 is resiliently held on the operating shaft 19 and will give to take up any slight variations in the material being formed. The spring 16 is adjusted by rotating the plates 18 about the threaded portion of the shaft 19.

As seen, the bottom face of the cover plate 15 is provided with annulus-shaped edge portions which cooperate with and seal off complementary portions of the top edges of the parison and blow molds, respectively. Spaced inwardly of the edge annulus I have provided an annular groove which provides a receiving portion for the edges of the parison in one case and of the ware in the other case.

A valve 40 is mounted on the vertical operating shaft 39 and is beveled to slidably fit within the lower end of the plunger 42, to seal off the inside of the plunger when a blank is being pressed. The valve 40 and its associated shaft 39 are normally forced upwardly by a spiral spring 43. This spring is positioned on the upper end of the shaft 39; at one end it abuts a valve disc 41 and at the other end, abuts the upper end of the plunger 42. When the plunger 42 has entered the blow mold 24, air under pressure supplied through the line 45 is sufficient to force the valve disc 41 off its seat against the spring 43, and to move the valve 40 outwardly and permit air to enter the mold and blow the blank into a suitably shaped article.

The plunger 42 is preferably removably secured to the operating or reciprocating shaft 19, in order that various sizes and shapes may be employed to form different articles. As shown in Figures 3 and 4, the lower end of shaft 19 is threaded to fit over a threaded offset portion of the plunger 42.

A post 20 extends from the carrier table 10 and receives a pivot bolt 22 which pivotally supports a pair of pincer-like arms or blow mold section support members 21. Each mold support arm 21 is, at its other end, provided with a substantially semi-circular sleeve-like portion within which a mold section 24 is positioned. The arms 21 are moved inwardly and outwardly with respect to each other about their common axis 22, by a pair of semi-circular operating links 27.

Each link is at one end pivotally connected substantially centrally by a pin 26 to a mold support arm 21 and is at its other end pivotally mounted by a pin 28 on a cam plate member 29. The cam plate member 29 is in turn feathered to a vertically-extending operating shaft 30 which is actuated to turn in either direction by cams 30a that cooperate with suitable fixed cams 30b extending from the framework 1.

By reason of the shape and arrangement of the links 27, they have an accelerated action during the major portion of their movement and a decelerated action when starting and stopping. This prevents any shock to the mechanism and provides a quick acting cup-opening and closing operation. The movement is fast when the links move off center and relatively slow when they first leave and then again approach center; they also securely lock the mold sections 24 in position and hold them locked for a desired period while the rotation of the carrier 6 continues. The links 27 are thrown substantially in line to lock, see B, Figure 2.

In Figure 2, A represents the position of the blow mold sections 24 and of their associated arms 21 and links 27 when they are separated with respect to each other. The parison mold 13 is shown in its radially extended position for receiving a gather or charge. B of the same figure shows the blow mold in a closed position after the plunger has been raised thereabove, and also shows the parison mold 13 in a retracted position at which a parison has been formed.

Each blow mold 24 is provided with a bottom cover plate 35, which has a rearwardly extending pair of bifurcated slide arms 36. The slide 36 is positioned at opposite sides by a pair of spaced guide rails 36a that are bolted to the table 10. The bottom plate 35 is radially retracted by means of a pin guide 37 extending upwardly from one bifurcation of the portion 36 and cooperating with a curved bifurcated operating arm 38. This arm 38 at one end receives the pin 37 within its bifurcations, and at its other end is feathered to the vertical operating shaft 30 in such a manner that a partial rotation or turn of the shaft 30 first causes the bottom plate 35 to move outwardly into substantial alinement with the mold sections 24 before the mold sections actually close about it.

The upper carrier 50 extends radially outwardly from the rotating vertical column 6 and supports operating cylinders 51 for the pistons 54. Each pair of vertically-spaced parison and blow mold cups is preferably provided with an associated plunger 42 and operating chamber 51. A screw sleeve 55 fits on a threaded extending portion of the chamber 51 and seals packing therein in a suitable manner. I have also shown, see Figure 1, adjustable plates 49 which are threaded upon the plunger operating shaft 19 to limit the upward stroke of the piston 54.

Figure 5:
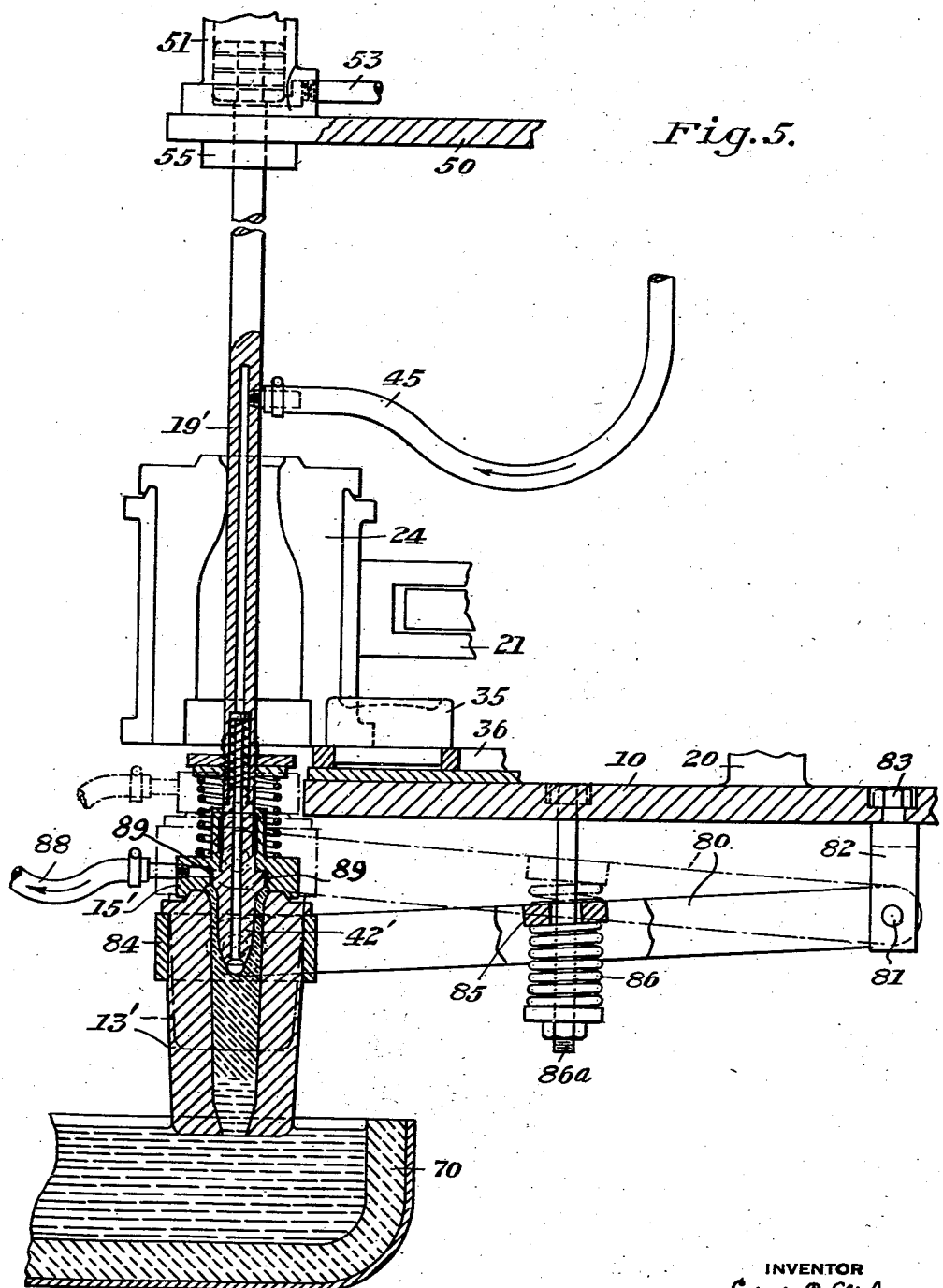
Figure 5 is a vertical sectional elevation of a modified form of structure employing my invention and having a suction type of parison mold adapted to skim the surface of glass in a forehearth.

In the modified form of my invention shown in Figure 5, the blank mold cup 13' is provided with a collar 84 which is supported by a substantially horizontally-extending arm 80. Arm 80 is pivotally mounted at one end by a pin 81 upon a post 82 extending downwardly from the carrier table 10, and is removably secured to such table by bolts 83. The arm 80 which is provided for each of the blank molds 13' is substantially centrally hollowed out to provide a positioning annulus 85 against which a spring 86 is adapted to abut. A bolt 86a extends downwardly from the carrier 10 to position spring 86 and to movably hold the cup 13' in a raised position with respect to the table. The plunger 42' and its associated plate 15' move the cup 13' downwardly and compress spring 86 at the proper timed instant during the rotation of the carrier 1. The cup 13' will then skim across the glass in the forehearth 70' while glass is being sucked up by suction applied to line 88. After a charge has been gathered, the pressure against plunger 42' is released and spring 86 snaps the cup 13' back, see the dotted lines of Figure 5. As the operation of this modification is otherwise substantially the same as the previously described structure, further description is unnecessary.

In this embodiment, the top cover plate 15' is removably screw-threaded to the enlarged portion of the operating shaft 19' and the plate has vertical ports 89 between its inner walls and the outer walls of the plunger 42', in order that the suction line 88 will have passage to the inside of cup 13' when the cover plate 15' is in place.

In operation, a glass charge is dropped into the parison mold 13 in the embodiment of Figure 3 and is sucked up in the parison mold 13' in the embodiment of Figure 5. The parison mold 13 is then moved (radially inwardly in the embodiment of Figure 1) to a position in alinement with its associated, but upwardly-spaced pair of blow mold sections 24.

Fluid is introduced through the valve 8, see Figure 1, into the line 52 to actuate the piston 54 and move it downwardly. Piston 54 moves the plunger 42 and its associated valve 40, as well as the top cover plate 15, to a cooperative position with respect to the top portion of the blank mold 13 or 13'. As the plunger portion 42 moves within the mold, the collected or gathered glass is partially formed, being pressed and forced upwardly against the cover plate 15 and within the grooved, lip-forming portion thereof. Then, a cam 14a on the frame 1 actuates a knock-out 14, and simultaneously therewith, fluid is admitted through line 53 to the lower side of cylinder 51, causing the plunger 42 and top plate 15 to move upwardly. The upper side of the cylinder is at this time connected to exhaust from line 52 through valve 8. If desired, the upper actuation of piston 54 may be accomplished by connecting line 53 to an accumulator chamber 7 and building up back pressure during the downward movement of the piston, see my copending application. Although I show a valve mechanism 8, the flow of fluid to and from the cylinder 51 may be controlled by any suitable mechanism, preferably timed to the rotation of the carrier tables.

I contemplate employing a suction force to aid the plunger 42 or 42' in holding or gripping the partially-formed blank while it is being lifted to the finish mold 24. That is, the suction force may be maintained in line 88, see Figure 5, to aid the plunger 42 in partially forming a blank and in lifting it out of the cup 13'. Of course, it is apparent that the suction aid method can be readily applied to the embodiment of my invention shown in Figure 1 of the drawings. Suction may be applied to line 88 by a valve mechanism (not shown) timed in accordance with the operation of the machine.

After the plunger 42 has been sufficiently raised in order that the top plate 15 will clear the blow mold sections 24, the bottom cover plate 35 is then moved outwardly to a substantially coaxial position with respect to the mold sections 24, and the mold sections 24 are closed about the bottom plate 15 and locked in this position, see B of Figure 2, by reason of the cooperative action of the links 27 and the arms 21 when the links are thrown substantially on center. At this time, the plunger 42 and its associated cover plate 15 are moved downwardly to close off the top of the blow mold sections. That is, a fluid under pressure is permitted to again enter the upper portion of the chamber 51 to actuate the piston 54 in its downward movement. After this has been done, air is forced through the line 45 and the ware formed.

After an article of ware has thus been formed, cams 30a and 30b again actuate the shaft 30 to first open the partible sections 24 and then to withdraw the bottom cover plate radially backwardly out of position. The ware is then discharged and the plunger 19 again moved downwardly to a cooperating relationship with respect to a blank mold 13 in the manner previously explained, and the cycle is continued.

Attention is called to the fact that my invention is not limited to the forming of glassware, although it has particular application in such a connection, and that it may be successfully employed for the forming of articles from various types of materials, without departing from the spirit of the invention.

While I have described certain embodiments of my invention for the purpose of illustration, it will be apparent to those skilled in the art that many changes, modifications, substitutions, additions and omissions or combinations thereof may be made without departing from the spirit and scope of the invention as indicated in the appended claims.

I claim:

1. In a method of manufacturing glass articles, the steps of placing a gather of glass within a blank mold, providing a shaper in the blank mold adjacent one end thereof, moving the glass gather about the shaper within the blank mold to form a parison, holding the parison on the shaper by a fluid suction application to the parison while raising the shaper and parison out of the blank mold to a position thereabove and while placing the shaper and parison in a blow mold, and applying fluid pressure through the shaper to blow the parison in the blow mold.

2. In a method of manufacturing glass articles, the steps of moving a blank mold into a gathering position with respect to a glass batch, providing a shaper in the blank mold adjacent an end thereof, introducing a glass charge from the batch into the blank mold, forcing the charge in the blank mold about the shaper to form a parison, holding the parison on the shaper by a fluid agency while moving the shaper and parison out of the blank mold and raising them into a blow mold, and without removing the shaper introducing fluid pressure therethrough to blow the parison in the blow mold.

3. In a method of manufacturing glass articles, the steps of moving a blank mold downwardly into a glass batch, providing a shaper in the blank mold adjacent an end thereof, sucking up a charge of glass into the blank mold from the batch and moving it about the shaper to form a parison, holding the parison on the shaper by a fluid agency while raising the shaper and parison out of the blank mold to a position thereabove and while placing the shaper and parison in a blow mold, and applying fluid pressure through the shaper to blow the parison in the blow mold.

4. In a method of manufacturing glass articles, the steps of introducing a glass charge into a blank mold, providing a shaper in the blank mold adjacent an end thereof, moving the glass charge about the shaper within the blank mold to form a parison, holding the parison on the shaper by a fluid agency while moving the shaper and parison out of the blank mold into a blow mold, and without removing the shaper introducing fluid pressure therethrough to blow the parison in the blow mold while hydraulically pressing the shaper inwardly with respect to the parison in the blow mold.

5. In a method of manufacturing glass articles, the steps of introducing a glass charge into a blank mold, hydraulically holding a shaper in the blank mold adjacent an end thereof while moving the glass charge about the shaper to form a parison, holding the parison on the shaper by a fluid agency while raising the shaper and parison into a blow mold, and without removing the shaper and while hydraulically holding it within the blow mold, introducing fluid pressure therethrough to blow the parison in such blow mold.

6. In a method of manufacturing glass articles, the steps of introducing a glass charge into a blank mold, providing a shaper in the blank mold adjacent an end thereof, moving the glass charge about the shaper within the blank mold to form a parison, holding the parison on the shaper by a fluid agency while raising the shaper and parison out of the blank mold into a blow mold, and without removing the shaper, and introducing gaseous fluid pressure therethrough to blow the parison in the mold while pressing the shaper inwardly with respect to the parison in the blow mold.

7. In a method of manufacturing glass articles, the steps of introducing a glass charge into a blank mold, providing a shaper in the blank mold, moving the glass charge about the shaper within the blank mold to form a parison mouth portion thereabout, holding the parison mouth portion on the shaper by a fluid agency while moving the shaper and parison out of the blank mold into a blow mold, and thereafter blowing the parison in the blow mold through the shaper.

EDWIN E. SLICK.